Aug. 18, 1953
B. H. BARNES
2,648,862
PIPE WIPER
Filed May 27, 1946
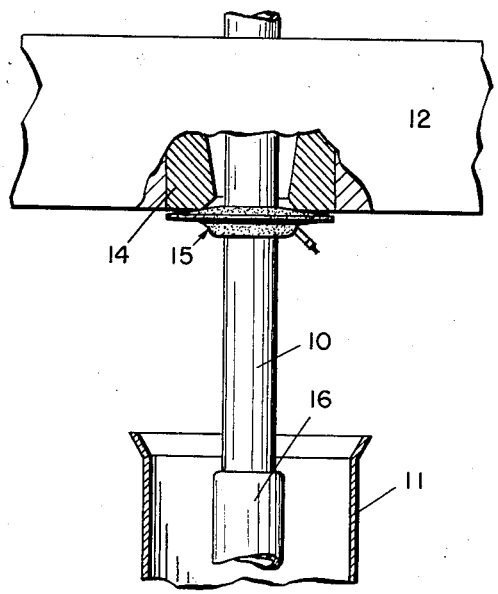
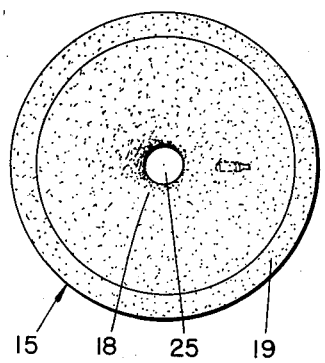
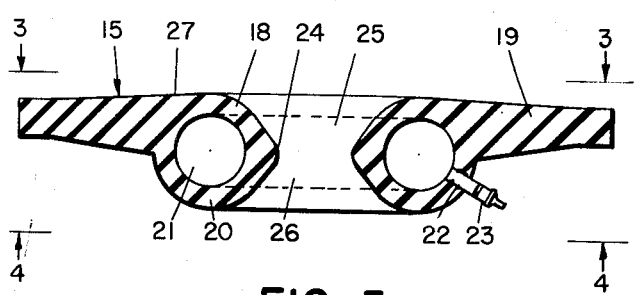
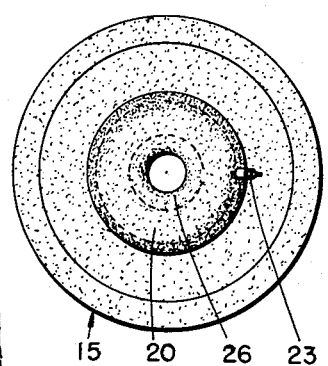
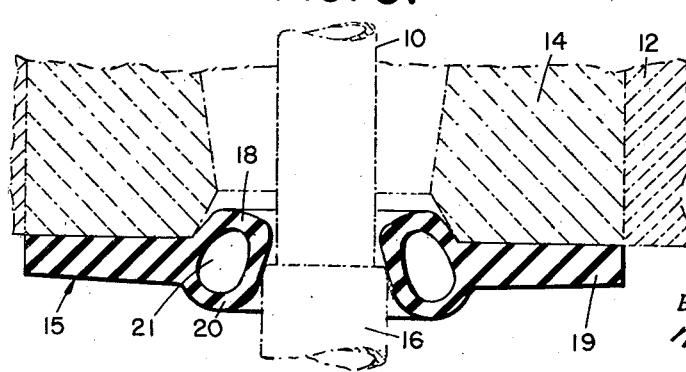
*INVENTOR.*
BYRON H. BARNES
BY
*Mason & Graham*
ATTORNEYS Patented Aug. 18, 1953

2,648,862

UNITED STATES PATENT OFFICE 2,648,862

PIPE WIPER

Byron H. Barnes, Los Angeles, Calif.

Application May 27, 1946, Serial No. 672,459

3 Claims. (Cl. 15—210)

This invention relates generally to pipe wipers such as are used in the drilling and servicing of oil wells for the purpose of wiping the drill pipe or the tubing as the same is pulled from the well.

The modern practice of deep well drilling is to employ the rotary drilling method wherein a string of pipe having a bit at the bottom is rotated in the well while drilling fluid or mud is pumped down through the pipe for the purpose of washing away the cuttings and the sealing the wall of the hole. It is necessary from time to time to remove the string of pipe from the well and, in so doing, a considerable amount of the drilling fluid adheres to the pipe and this must be removed to prevent its draining off onto the floor of the derrick as the pipe is stacked, thereby creating a slippery, hazardous working condition. It is common to remove the mud by playing a stream of water on the pipe as it is withdrawn, but this is objectionable because it serves to dilute the mud in the hole. In some cases it has become the practice to use some means for wiping the pipe as it is drawn from the hole, such as a flexible disc or the like, but such means have not been entirely satisfactory.

In my copending application for patent, Serial No. 595,001, now abandoned, I show a pipe wiper embodying a flexible tubular ring member for engaging the pipe and a retaining ring associated therewith, and it is an object of this invention to provide an improvement on the pipe wiper set forth in my earlier application.

It is, therefore, a primary object of this invention to provide a new and improved wiper to be mounted on a drill pipe immediately below the conventional rotary table which will efficiently wipe the pipe as it is withdrawn from the hole and which will readily permit of the passage of tool joints, couplings, protectors, and other normal projections on the pipe.

It is a particular object to provide a simply constructed self-supporting wiper made from a single material. In this connection it is an object of the invention to provide a resilient annular member having an inner hollow portion in the form of a tubular ring which may be inflated and having an outer solid relatively stiff portion capable of supporting the member as a whole against being pulled through the rotary table by the upward movement of the pipe being wiped.

It is also an object of the invention to provide a wiper which is particularly designed and shaped to efficiently wipe the pipe and to facilitate the passage of couplings and other normal projecting portions of the pipe as it is drawn therethrough.

It is a further object to provide a pipe wiper which may be easily installed and which has a relatively long life.

These and other objects will be apparent from the following description and the drawing. Referring to the drawing, which is for illustrative purposes only:

Fig. 1 is a view partly in section showing the wiper of the invention mounted on a drill pipe immediately below a rotary table and showing the upper end of the water string or outer casing of the well;

Fig. 2 is an enlarged cross sectional view of the wiper member of Fig. 1;

Fig. 3 is a top plan view of the wiper member drawn to a smaller scale than Fig. 2;

Fig. 4 is an inverted plan view of the wiper member on the same scale as Fig. 3; and Fig. 5 is an enlarged cross sectional view of the wiper member shown with relation to a rotary table and a drill pipe being pulled through the wiper with the wiper in deflected position as it is about to pass a tool joint on the pipe.

Reference numeral 10 generally indicates a drill pipe which is shown extending out of a well, the outer casing of which is indicated at 11, up through the conventional rotary table, fragmentarily shown at 12. The rotary table is shown as including a master bushing 14 and immediately below this there is shown the wiper of this invention, indicated generally by numeral 15. In Fig. 1 the wiper member is shown positioned on the pipe in the position it ordinarily occupies during wiping of the portions of the pipe intermediate the couplings or tool joints, one of which is shown at 16.

Referring to Figs. 2-5, inclusive, for a more detailed description of the wiper, the wiper is preferably formed of a resilient or elastic material, such as rubber or a rubber composition, and may be described as comprising an annular member which includes an inner hollow pipe engaging portion 18 and an outer solid portion 19. The inner portion is in the form of a tubular ring 20 having the hollow or tubular passage 21 therein.

In the form of the invention shown, a tube 22 is provided extending through the wall forming the tubular ring 20, and this tube is provided with a check valve 23 so that the tubular ring may be inflated to any desired pressure. The inner wall portion of the tubular ring portion of the wiper is preferably thicker than the remainder of the wall portion in this region and is so shaped as to provide an annular protuberance 24 medially of the wiper. With this construction the opening through the wiper, indicated by 25, converges from the top and from the bottom to the middle. This construction is advantageous in that it aids in the passage of joints, couplings and other projections on the pipe through the wiper. In addition, as the projections are passed through the wiper and the wiper returns to normal size for wiping the main sections of pipe, this construction prevents the rotary mud on the pipe from being splashed or squirted out the upper end of the wiper through the rotary table into the faces of the workmen, as often happens with wipers now in use.

Formed on the inner portion 18 of the wiper is the solid portion of the wiper 19 which may be described as being in the form of a disc-like flange extending around the inner portion. Preferably, this outer portion 19 extends around the upper half of the inner portion in order to provide a relatively flat upper face 27 for abutment against the master bushing 14. It will be apparent from the construction described and illustrated that the flange or outer portion 19 of the wiper is relatively stiff and thick-walled compared to the wall of the inner portion 18 and with this construction the wiper member is sufficiently stiff to prevent its being drawn through the rotary table by the upward movement of the pipe and especially during the passage through the wiper of pipe tool joints, couplings and the like, while at the same time it is sufficiently flexible in the region adjacent the pipe to adequately wipe the pipe and at the same time permit passage of couplings and the like. In this connection, in Fig. 5 there is shown the pipe 10 with the tool joint 16 about to be drawn through the wiper member. Here it will be apparent that, as the tool joint 16 engages the inner portion of the wiper member, the construction of the inner wall of the inner portion 18, providing the converging opening in the wiper, permits of the wiper being partially rolled away from the entering tool joint and being elongated somewhat thereby assisting in the passage therethrough of the joint. As the tool joint passes the wiper, the inner portion 18, due to its own resiliency and elasticity, quickly resumes its normal shape and is effective for wiping the main body of pipe.

In the operation of the wiper it is only necessary to mount the same on the pipe and position it below the rotary table or other suitable means against which it can abut as pipe is drawn through it. In practice, when the wipers are new the pressure in the inner part of the ring may be atmospheric. As the wiper wears and loses its original elasticity and shape, it is desirable to inflate the ring to a pressure above atmospheric pressure to render the wiper efficient.

I claim:

1. A device for wiping pipe as it is withdrawn from a well, comprising an annular member of resilient material adapted to receive the pipe to be wiped and having an inner portion in the form of a tubular ring and having an outer portion in the form of a radially projecting flange about the periphery of said inner portion, the inner wall of said annular member being shaped to provide an annular protuberance midway of the opening through the member whereby said opening converges from the top and from the bottom to the medial portion thereof.

2. A pipe wiping device adapted to be floatingly disposed below an abutment and adapted to receive a pipe to be wiped, comprising an annular member formed of a relatively stiff material having an inner portion in the form of a resilient tubular ring and having an outer portion in the form of a radially projecting flange extending around the upper half of the inner portion whereby the upper surface of said member is substantially planiform for engagement with an abutment.

3. A pipe wiping device adapted to be floatingly disposed below an abutment and adapted to receive a pipe to be wiped, comprising an annular member formed of a relatively stiff material having an inner portion in the form of a resilient tubular ring and having an outer portion in the form of a radially projecting flange extending around the upper half of the inner portion whereby the upper surface of said member is substantially planiform for engagement with an abutment, the inner wall of said annular member being shaped to provide an annular protuberance midway of the opening through the member whereby said opening converges from the top and bottom to the medial portion thereof.

BYRON H. BARNES.

References Cited in the file of this patent

UNITED STATES PATENTS

| Number | Name | Date |
|---|---|---|
| 1,475,289 | Diescher | Nov. 27, 1923 |
| 1,801,995 | Bell | Apr. 21, 1931 |
| 1,823,233 | Bell | Sept. 15, 1931 |
| 2,272,395 | Ballagh | Feb. 10, 1942 |
| 2,328,127 | Crickmer | Aug. 31, 1943 |
| 2,362,935 | Schlobohm et al. | Nov. 14, 1944 |
| 2,392,146 | Hall | Jan. 1, 1946 |